US011143147B2

(12) United States Patent
Turous et al.

(10) Patent No.: US 11,143,147 B2
(45) Date of Patent: Oct. 12, 2021

(54) AIR INTAKE SYSTEMS HAVING CONDENSATE RETAINING STRUCTURES

(71) Applicant: Honda Motor Co., Ltd., Tokyo (JP)

(72) Inventors: Jeremy G. Turous, Columbus, OH (US); David Matthew Hawkins, Columbus, OH (US); Stanley D. Lent, Marysville, OH (US); David J. Vallo, Columbus, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 84 days.

(21) Appl. No.: 16/675,436

(22) Filed: Nov. 6, 2019

(65) Prior Publication Data
US 2021/0131387 A1 May 6, 2021

(51) Int. Cl.
*F02M 33/00* (2006.01)
*F02M 35/10* (2006.01)
*B01D 45/04* (2006.01)
*F02M 35/04* (2006.01)
*B01D 46/10* (2006.01)
*F02M 35/00* (2006.01)
*F02M 35/02* (2006.01)
*F02M 35/06* (2006.01)

(52) U.S. Cl.
CPC ............. *F02M 33/00* (2013.01); *B01D 45/04* (2013.01); *B01D 46/10* (2013.01); *F02M 35/04* (2013.01); *F02M 35/10013* (2013.01); *F02M 35/10144* (2013.01); *F02M 35/10157* (2013.01); *F02M 35/10268* (2013.01); *F02M 35/00* (2013.01); *F02M 35/02* (2013.01); *F02M 35/06* (2013.01)

(58) Field of Classification Search
CPC .. F02M 33/00; F02M 35/10144; F02M 35/00; F02M 35/01; F02M 35/10157; F02M 35/10013; F02M 35/04; B01D 45/04; B01D 46/10
USPC ......................................................... 123/542
See application file for complete search history.

(56) References Cited

U.S. PATENT DOCUMENTS

| | | | |
|---|---|---|---|
| 7,530,336 B2 | 5/2009 | Brecheisen, II | |
| 9,109,500 B2 | 8/2015 | Cockerill | |
| 9,394,825 B2 | 7/2016 | Dziubinschi et al. | |
| 10,254,056 B2 | 4/2019 | Steurer et al. | |
| 2005/0011198 A1* | 1/2005 | Ritland | F02C 7/1435 60/775 |
| 2011/0094219 A1* | 4/2011 | Palm | F28F 17/005 60/599 |

(Continued)

FOREIGN PATENT DOCUMENTS

| | | |
|---|---|---|
| CN | 204060907 U | 12/2014 |
| DE | 102017209359 A1 | 2/2018 |

(Continued)

*Primary Examiner* — Joseph J Dallo
*Assistant Examiner* — Yi-Kai Wang
(74) *Attorney, Agent, or Firm* — Plumsea Law Group, LLC (57) ABSTRACT

An intake system for an internal combustion engine may include an air inlet; a forced induction device downstream from the air inlet; an intercooler downstream from the forced induction device; and an intake conduit configured to guide air from the intercooler to an internal combustion engine. In addition, the system may include a condensate retaining structure associated with the intake conduit and configured to restrict the flow of condensate through the intake conduit.

20 Claims, 7 Drawing Sheets

(56) References Cited

U.S. PATENT DOCUMENTS

2015/0047615 A1* 2/2015 Rollins ............... F01M 13/022
  123/520
2018/0252482 A1 9/2018 Koo

FOREIGN PATENT DOCUMENTS

| EP | 1724453 A1 | 11/2006 |
|----|------------|---------|
| JP | 2007229583 A | 9/2007 |
| JP | 2014109259 A | 6/2014 |
| WO | 2017082481 A1 | 5/2017 |

* cited by examiner

AIR INTAKE SYSTEMS HAVING CONDENSATE RETAINING STRUCTURES

BACKGROUND OF THE INVENTION

The present disclosure is directed to an air intake system for an internal combustion system and, more specifically, an air intake system including one or more condensate retaining structures to prevent sudden ingestion of large quantities of condensation into the engine.

In order to produce more power and reduce emissions, many engine manufacturers utilize forced induction devices, such as turbochargers or superchargers, in their intake systems. Such devices force more air into the engine and, in doing so, compress the air before it is delivered to the engine. Although this increases the amount of oxygen delivered per unit volume of air, this compression increases the temperature of the air, thus counteracting at least some benefit of compressing the air in the first place. In order to reduce the temperature of the compressed air, intercoolers are utilized. Intercoolers are heat exchange devices placed between a forced induction device and the engine. By passing compressed air through an intercooler, the air delivered to the engine can be compressed while maintaining a relatively lower temperature.

In some cases, cooling the air with the intercooler can cause moisture within the compressed air to condense, producing a condensate in the form of water droplets in the intake system. Particularly in humid ambient conditions, this condensation can be significant. As the condensate droplets collect within the intake system, a pool of the condensate can be formed. For example, in an automobile, during steady state cruising, condensate can collect at certain points in the intake system. When more power is demanded of the engine, such as during a wide open throttle condition, the airflow through the intake system can increase rapidly to a high rate, causing the collected condensate to be suddenly delivered all at once to the engine. This can cause a misfire of one or more cylinders. Not only can misfires affect drivability, but also, misfires can result in increased exhaust temperatures.

The present disclosure is configured to address one or more of the issues discussed above.

SUMMARY OF THE INVENTION

The present disclosure is directed to condensate retaining structures for restricting delivery of condensate collected in the intake system into the engine. For example, one or more structures having enlarged diameters may be used to provide a shoulder that will capture condensate in the intake conduit. In other embodiments, one or more weirs may be disposed on the inner wall of the intake conduit to prevent sudden delivery of large quantities of condensate to the engine.

In one aspect, the present disclosure is directed to an intake system for an internal combustion engine. The intake system may include an air inlet; a forced induction device downstream from the air inlet; an intercooler downstream from the forced induction device; and an intake conduit configured to guide air from the intercooler to an internal combustion engine. In addition, the system may include a condensate retaining structure associated with the intake conduit and configured to restrict the flow of water through the intake conduit.

In another aspect, the present disclosure is directed to an intake system for an internal combustion engine. The intake system may include an air inlet; a forced induction device downstream from the air inlet; an intercooler downstream from the forced induction device; and an intake conduit configured to guide air from the intercooler to an internal combustion engine. In addition, the system may include a condensate retaining structure associated with the intake conduit and configured to restrict the flow of condensate through the intake conduit. The condensate retaining structure may include a section of conduit having a larger diameter than other portions of the intake conduit.

In another aspect, the present disclosure is directed to an intake system for an internal combustion engine. The intake system may include an air inlet; a forced induction device downstream from the air inlet; an intercooler downstream from the forced induction device; and an intake conduit configured to guide air from the intercooler to an internal combustion engine. In addition, the system may include a condensate retaining structure associated with the intake conduit and configured to restrict the flow of condensate through the intake conduit. The condensate retaining structure may a weir extending inward from a wall of the intake conduit.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
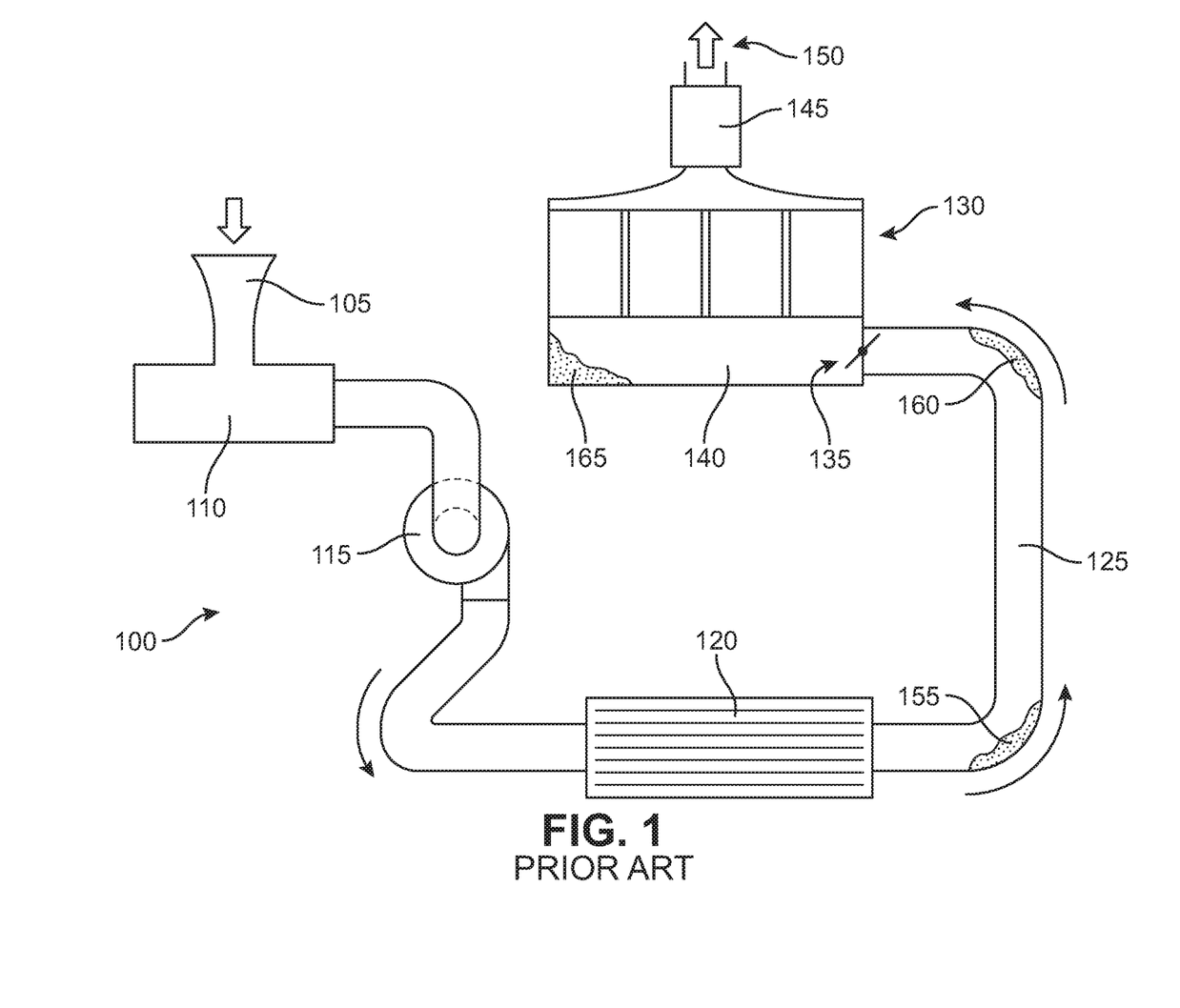
FIG. 1 shows a schematic illustration of an internal combustion engine and intake system according to a prior art embodiment.

FIG. 1 shows a schematic illustration of an internal combustion engine and intake system according to a prior art embodiment. For example, FIG. 1 shows an intake system 100 for an internal combustion engine 130. Intake system 100 may include an air inlet 105 for receiving air. The air received by air inlet 105 may generally be ambient air. It will be understood, however, that in some cases air inlet 105 may be housed in an engine bay, which may be a relatively warmer environment than ambient air outside of the engine bay. Intake system 105 may also include an air box 110. In some embodiments, air box 110 may include an air filter (not shown).

Intake system 105 may also include a forced induction device 115 downstream from air inlet 105. Forced induction device 115 may be any type of force induction device including, for example, a turbocharger or supercharger. It will be understood that more than one forced induction device may be used at the same time (e.g., twin turbos). Further, in some embodiments, both a turbocharger and a supercharger may be utilized together.

In addition, intake system 105 may include an intercooler 120 downstream from forced induction device 115. Intercooler 120 may cool air received from forced induction device 115 and deliver the cooled, compressed air via an intake conduit 125 configured to guide air from intercooler 120 to an internal combustion engine 130. As shown in FIG. 1, intake conduit 125 may deliver air to an intake manifold 140. The flow of air into manifold 140 may be regulated by a throttle valve 135. Once the air enters engine 130 and is combusted along with fuel, the exhaust exits into a catalytic converter 145 and ultimately released into the atmosphere via an exhaust outlet 150. It will be understood that the exhaust system may include other components that are not shown, such as mufflers, resonators, oxygen sensors, etc.

Condensation can collect in various places in an intake system, such as intake system 100. For example, as shown in FIG. 1, a first pool 155 of condensate can form at a first bend in intake conduit 125. Similarly, a second pool 160 of condensate can form at a second bend in intake conduit 125. In addition, a third pool 165 of condensate can form in a corner of intake manifold 140. One or more pools of condensate like these can build up during cruising situations and then be delivered suddenly to the engine during a hard acceleration or other heavy engine load situation. Sudden ingestion of large quantities of condensate can cause misfire in one or more cylinders and, consequently, excess heat in the exhaust.

Figure 2:
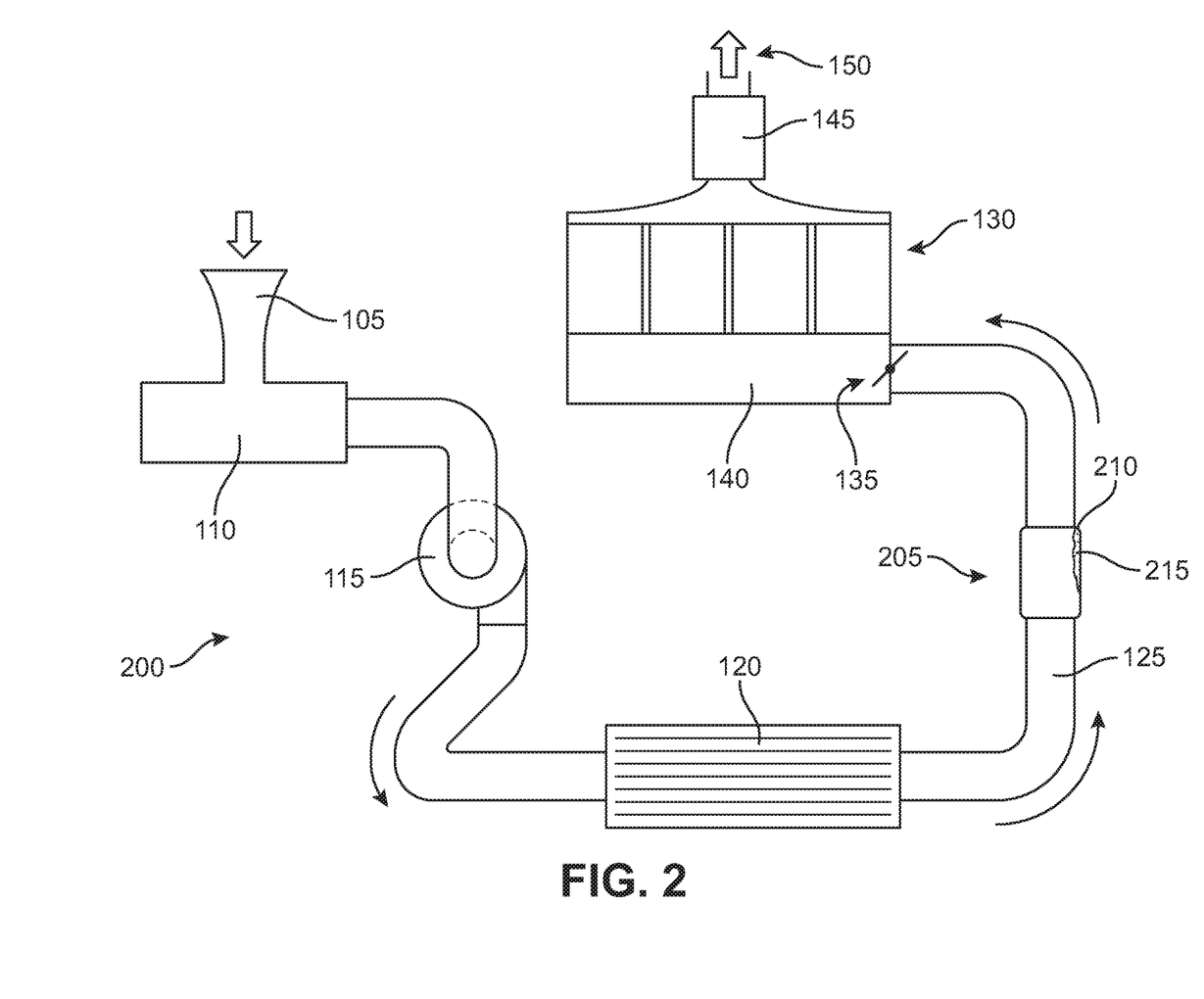
FIG. 2 shows a schematic illustration of an internal combustion engine and intake system with condensate retaining structure according to an exemplary embodiment.

FIG. 2 shows a schematic illustration of an internal combustion engine and intake system with condensate retaining structure according to an exemplary embodiment. As shown in FIG. 2, an intake system 200 includes a condensate retaining structure 205 associated with intake conduit 125 and configured to restrict the flow of condensate through intake conduit 125. As further shown in FIG. 2, in some embodiment, condensate retaining structure 205 may be a section of conduit having an enlarged cross-sectional area as compared to other portions of intake conduit 125 and forming an internal shoulder 210 configured to retain condensate. Condensate in intake conduit 125 can accumulate in a pool 215 of condensate against shoulder 210. In some embodiments, shoulder 210 may be radiused, thus forming a radiused transition between the enlarged cross-sectional area of condensate retaining structure 205 and the smaller cross-sectional area of intake conduit 125.

Thus, condensate can pool against shoulder 210 during a cruise condition wherein the engine is running at moderate load in a substantially steady state. Once the pool 215 of condensate has been formed during the cruise condition, if a high load condition, such as wide open throttle, occurs, shoulder 210 prevents a majority of condensate in the pool 215 from being delivered suddenly to the engine. Instead, a small portion of condensate from the pool 215, such as a trickle of droplets, may be delivered to the engine during the high load condition. If the high load condition persists, substantially all of the condensate from the pool 215 may ultimately be delivered to the engine. However, because of shoulder 210, the delivery of condensate to the engine will occur over a much longer duration, e.g., 5-10 seconds, as opposed to a short duration, e.g., approximately 1 second, as can occur without any condensate retaining structure in intake conduit 125. The engine can typically accommodate small amounts of condensate ingestion, and thus, the delivery of a slow trickle to the engine does not cause misfire like sudden delivery of large quantities of condensate does.

Condensate retaining structure 205 may be disposed in any portion of intake conduit 125. It will be understood, however, that there are benefits and limitations of using a condensate retaining structure in certain locations. For example, if a condensate retaining structure is used proximate to intercooler 120, and thus further from engine 130, condensate droplets released in a trickle from a condensate retaining structure, can collect elsewhere in intake conduit 125 downstream of the condensate retaining structure. Such downstream collection may ultimately be delivered suddenly to the engine, causing misfire despite having a condensate retaining structure.

A condensate retaining structure disposed proximate engine 130, will provide the most atomized delivery of condensate to engine 130. However, without a condensate retaining structure upstream, condensate can pool significantly upstream of the condensate retaining structure. During high load conditions, condensate pooled upstream may be delivered downstream in a rush, and thus, may bypass a downstream condensate retaining structure because it is traveling too fast to be collected by the downstream condensate retaining structure.

Because of these factors, it may be advantageous to utilize more than one condensate retaining structure in intake conduit 125. Alternatively, or additionally, in some embodiments, a condensate retaining structure may be disposed approximately midway between intercooler 120 and engine 130, as shown in FIG. 2.

Figure 3A:
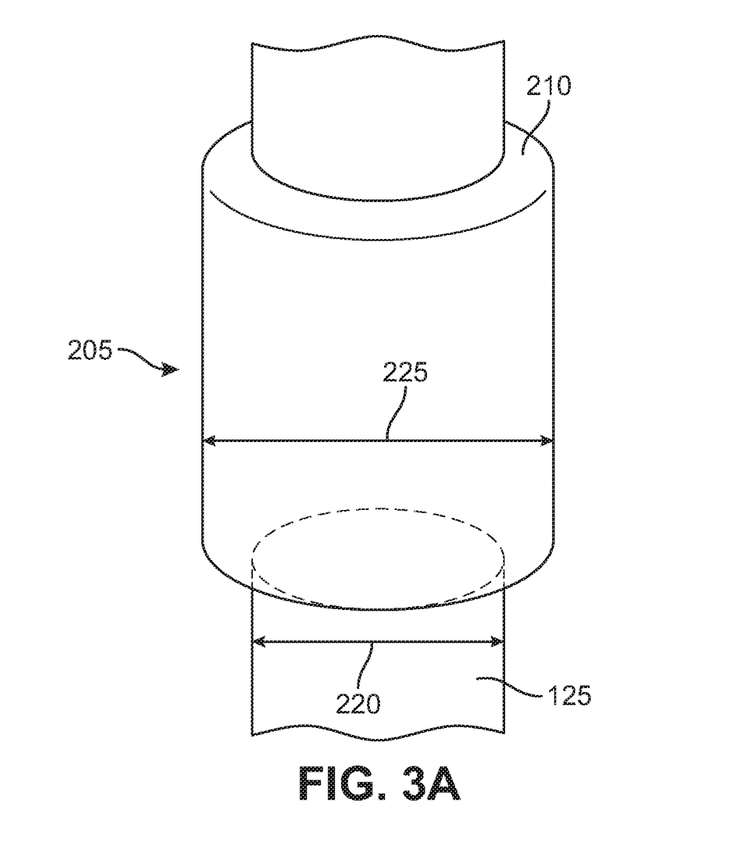
FIG. 3A shows a schematic closer view of the condensate retaining structure shown in FIG. 2.

FIG. 3A shows a schematic closer view of condensate retaining structure 205 shown in FIG. 2. Condensate retaining structure 205 may have any suitable cross-sectional shape. As shown in FIG. 3A, in some embodiments, condensate retaining structure 205 may have a substantially circular cross-sectional shape. That is, condensate retaining structure 205 may be substantially cylindrical. In order to provide shoulder 210, intake conduit 125 may have a substantially circular cross-sectional shape, as well, and condensate retaining structure 205 may have a larger diameter than the other portions of intake conduit 125. For example, as shown in FIG. 3A, intake conduit 125 may have a first diameter 220, and condensate retaining structure 205 may have a second diameter 225 that is larger than first diameter 220 of intake conduit 125.

Dimensional aspects of the condensate retaining structure may be factors in the effectiveness of the structure in retaining condensate. For example, the overall length of a condensate retaining structure, the proportional diameter of the structure relative to the conduit in which it is disposed, and/or the radius of the shoulder formed by the enlarged structure may be factors in determining how much condensate is retained during low load engine conditions and/or how easily the condensate is allowed to be released downstream during higher load engine conditions.

Regarding structure length, the greater the length of a condensate retaining structure (i.e., in the direction of air flow), the more condensate can be retained during low load engine conditions. That is, for a given diameter, a longer condensate retaining structure will retain a greater volume of condensate. It will be noted, however, that there may be a point at which the condensate retaining structure can be too long, and thus, retain too much condensate before allowing it to be released into the intake air flow during high load engine conditions. Considering these factors, an optimal retaining structure length may be selected for a given intake setup.

Regarding proportional diameter, a condensate retaining structure having a larger diameter relative to the diameter of the intake conduit may provide greater condensate retention. That is, for a given condensate retaining structure length, and a given intake conduit diameter, a larger diameter condensate retaining structure will hold a greater volume of condensate. Again, there may be a point at which the condensate retaining structure may hold too much condensate. Accordingly, there may be an optimal ratio between the diameter of the condensate retaining structure and the diameter of the intake conduit in which it is disposed.

Regarding the radius of the shoulder, this may affect the volume of condensate that can be held by the condensate retaining structure. A smaller radius provides a greater volume of capacity, whereas a larger radius provides a lesser volume of capacity. Again, there may be a point at which too large a capacity may be undesirable. In addition, the radius may affect how easily the condensate is allowed to flow out of the retention area during high load engine conditions. A relatively smaller radius may retain the condensate more under higher load conditions, whereas a relatively larger radius may allow condensate to be more readily dispensed into the airflow during higher load conditions. Considering these factors, an optimal shoulder radius may be selected.

Figure 3B:
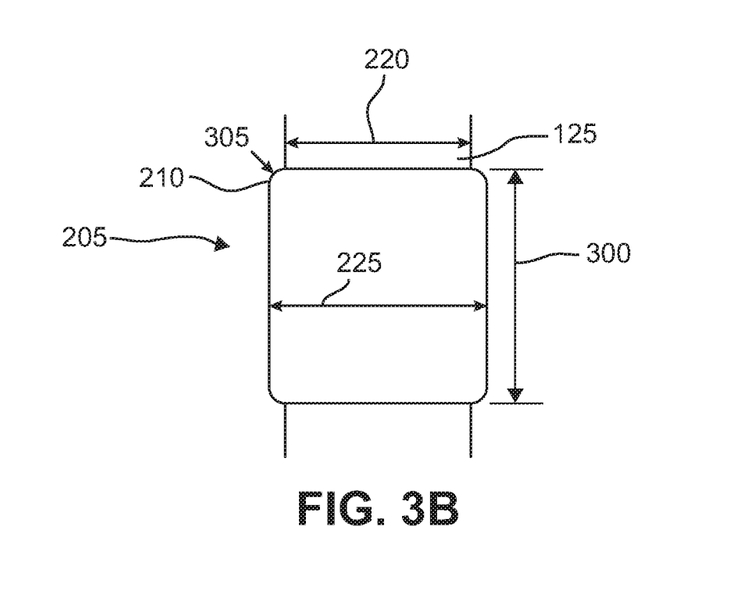
FIG. 3B shows a schematic side view of the condensate retaining structure shown in FIG. 2.

FIG. 3B shows a schematic side view of the condensate retaining structure shown in FIG. 2. FIG. 2 illustrates significant dimensions of intake conduit 125 and condensate retaining structure 205. FIG. 2 shows first diameter 220 of intake conduit 125. FIG. 2 also shows second diameter 225 of condensate retaining structure 205, as well as a length 300 of condensate retaining structure 205, and a shoulder radius 305 of shoulder 210.

In at least one embodiment, the components may have the following dimensions. In particular, condensate retaining structure 205 may have a length 300 of approximately 58 mm. In addition, intake conduit 125 may have a diameter of approximately 45 mm, and condensate retaining structure 205 may have a diameter of approximately 55 mm. Further, condensate retaining structure 205 may have a shoulder radius 305 of approximately 5 mm. In some embodiments, these may represent the internal dimensions of these components.

Accordingly, the ratio between second diameter 225 and first diameter 220 may be 55:45, i.e., approximately 1.22:1. In various embodiments, this ratio may be anywhere in the range of approximately 1.1:1 through approximately 1.5:1. In some embodiments, this ratio may be anywhere in the range of approximately 1.2:1 through approximately 1.25.

Further, the ratio between length 300 and second diameter 225 of condensate retaining structure 205 may be 58:55, or approximately 1.05:1. In some embodiments, this ratio may be anywhere in the range of approximately 0.9:1 through approximately 1.2:1. In some embodiments, this ratio may be anywhere in the range of approximately 1:1 through approximately 1.1:1. In addition, the ratio between length 300 and first diameter 220 may be 58:45, or approximately 1.3:1. In some embodiments, this ratio may be anywhere in the range of approximately 1.1:1 through approximately 1.5:1. In some embodiments, this ratio may be anywhere in the range of approximately 1.2:1 through approximately 1.4:1.

In addition, in the exemplary embodiment, shoulder radius 305 may be approximately 5 mm. It will be noted that, in some embodiments, shoulder 210 may be radiused over the entire transition between the sidewall of intake conduit 125 and the sidewall of condensate retaining structure 205. In various embodiments, shoulder radius 305 may be anywhere in the range of approximately 2 mm to approximately 10 mm. In some embodiments, radius 305 may be in the range of approximately 3 mm to 7 mm.

In addition, it will be noted that, in some embodiments, a condensate retaining structure may be disposed in a straight section of intake conduit 125, for example, as shown in FIGS. 2, 3A, and 3B. However, in some embodiments, the condensate retaining structure may be disposed on or near a bend in intake conduit 125. This may be beneficial, since condensate can accumulate at bends in intake conduits. So placing a condensate retaining structure in a location where condensate accumulation would typically occur can restrain that accumulated condensate from being suddenly delivered to the engine.

Figure 4:
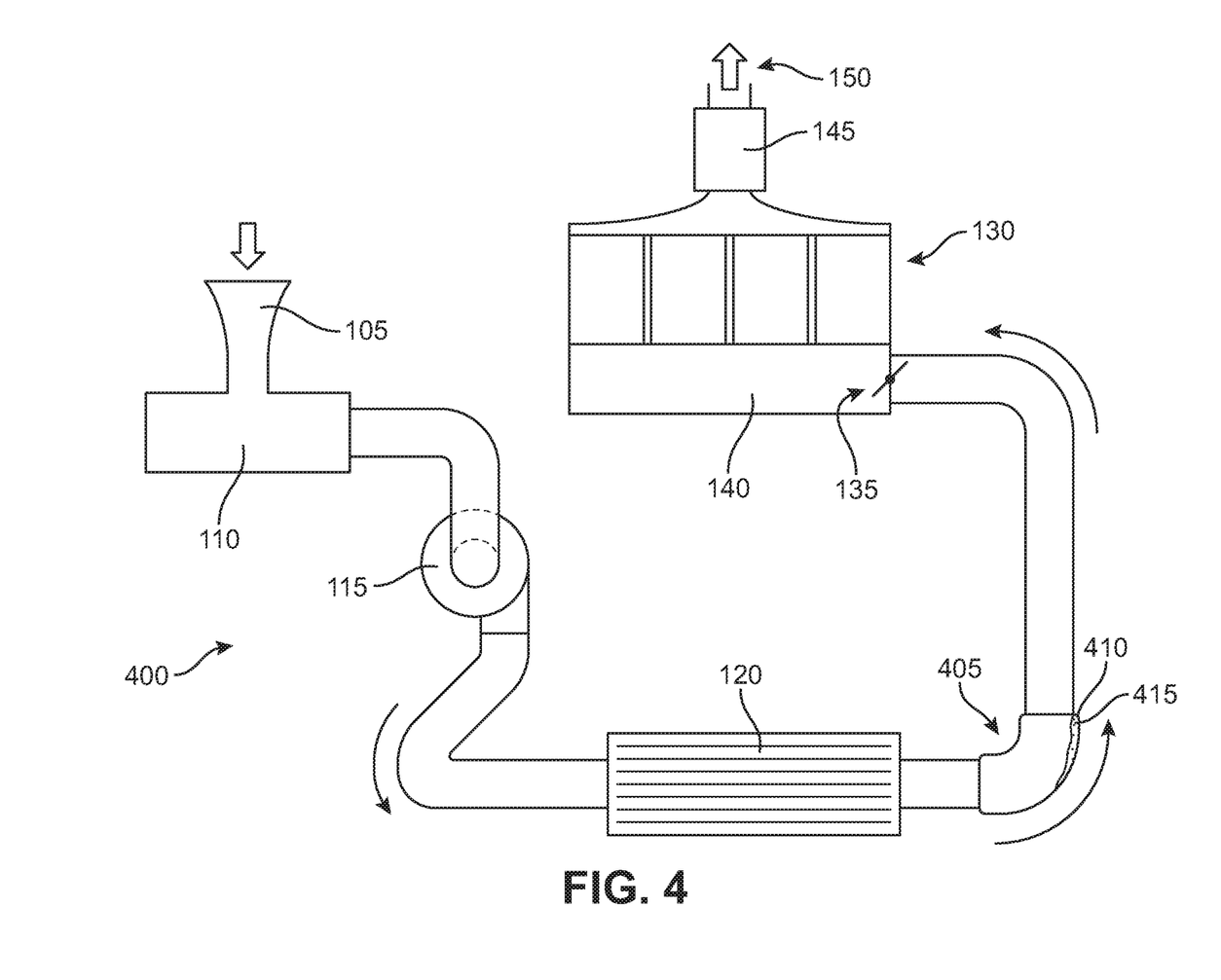
FIG. 4 shows a schematic illustration of an internal combustion engine and intake system with condensate retaining structure according to another exemplary embodiment.

FIG. 4 shows a schematic illustration of an internal combustion engine and intake system with condensate retaining structure according to another exemplary embodiment. In particular, FIG. 4 shows an intake system 400 including a condensate retaining structure 405. Condensate retaining structure 405 may include an internal shoulder 410 configured to retain condensate, as shown in FIG. 4 by a pool 415 of condensate. As further shown in FIG. 4, in some embodiments, condensate retaining structure 405 may form a bend between sections of intake conduit 125. As also shown in FIG. 4, in some embodiments, shoulder 410 may be provided at or near the downstream end of the bend, which is where condensate naturally collects in a bend.

Figure 5:
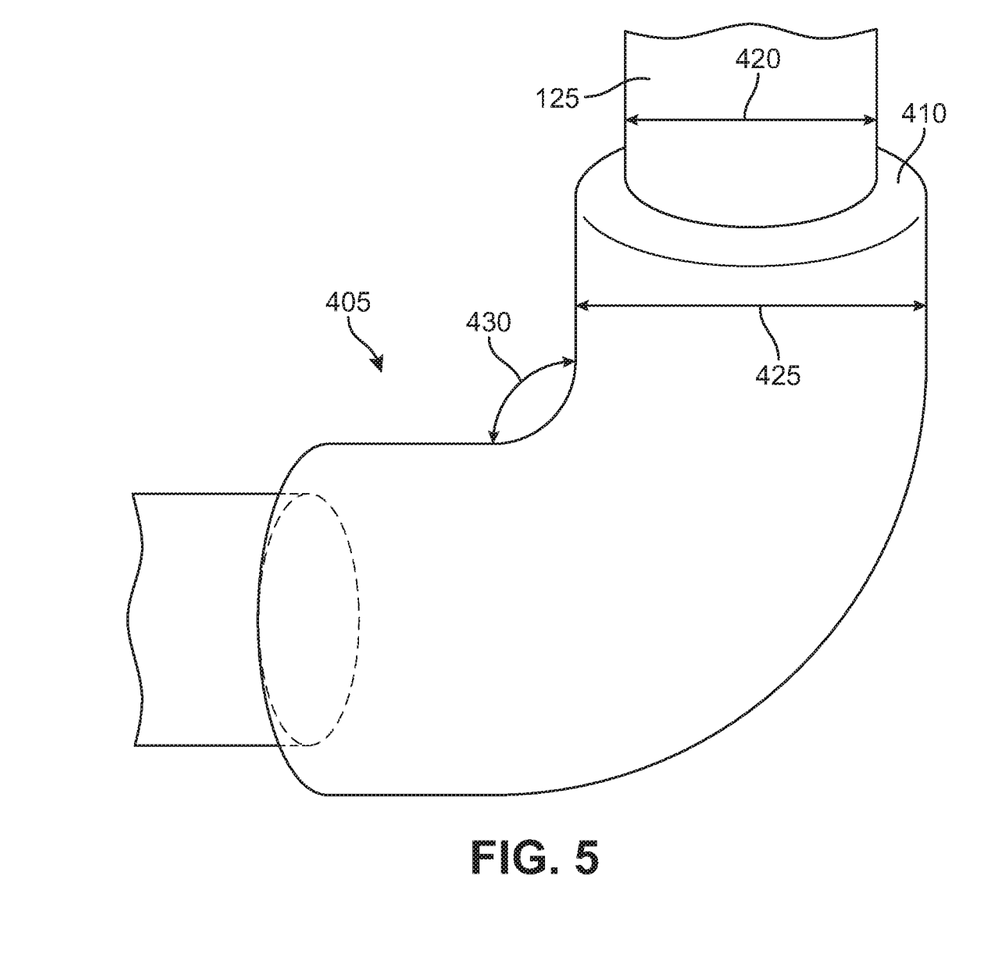
FIG. 5 shows a schematic closer view of the condensate retaining structure shown in FIG. 4.

FIG. 5 shows a schematic closer view of the condensate retaining structure shown in FIG. 4. As shown in FIG. 5, shoulder 410 is formed by the difference in diameter between intake conduit 125 and condensate retaining structure 405. In particular, intake conduit 125 may have a first diameter 420 and condensate retaining structure 405 may have a second diameter 425 that is larger than first diameter 420 of intake conduit 125.

In some embodiments, condensate retaining structure 405 may include a bend, as illustrated by an angle 430 in FIG. 5. It will be noted that, although angle 430 is illustrated as an approximately 90 degree angle, the dimension of angle 430 may be any suitable angle to accommodate the plumbing of the intake system.

It will be further noted that more than one bent condensate retaining structure may be provided in the same intake system. It will also be noted that, in some embodiments, straight condensate retaining structures, such as shown in FIG. 2 and FIG. 3, may be combined in the same intake system as bent condensate retaining structures, such as shown in FIGS. 4 and 5.

Figure 6:
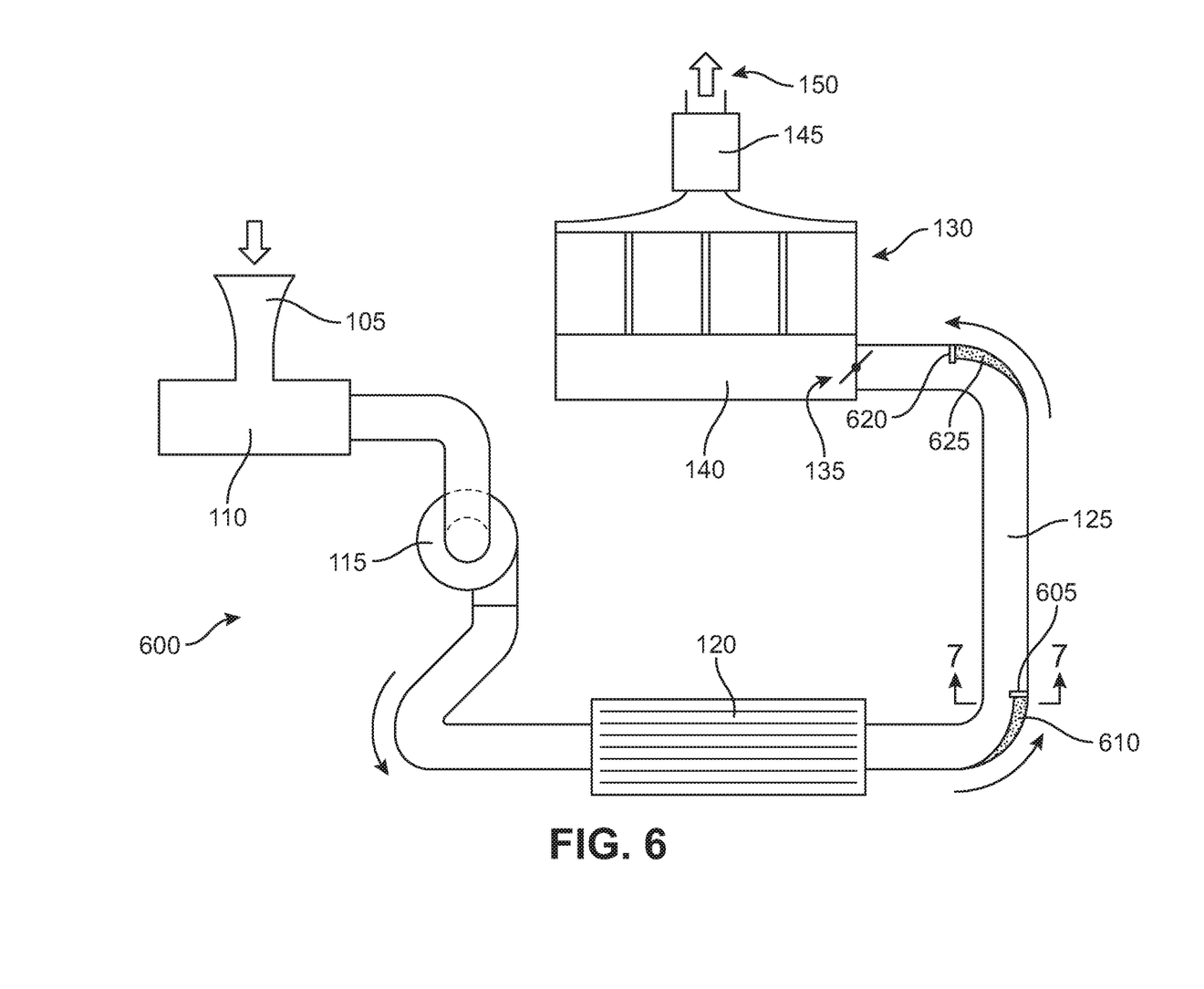
FIG. 6 shows a schematic illustration of an internal combustion engine and intake system with condensate retaining structures according to another exemplary embodiment.

FIG. 6 shows a schematic illustration of an internal combustion engine and intake system with condensate retaining structures according to another exemplary embodiment. FIG. 6 shows an intake system 600 including a first condensate retaining structure 605, configured to collect a pool 610 of condensate in intake conduit 125. In addition, FIG. 6 shows a second condensate retaining structure 620, configured to collect a second pool 625 of condensate in intake conduit 125.

First condensate retaining structure 605 and/or second condensate retaining structure 620 may be provided in the form of a weir extending inward from a wall of intake conduit 125.

Although the condensate retaining structures in FIG. 6 are shown to be substantially at opposite ends of intake conduit 125, it will be understood that, in some embodiments, a condensate retaining structure like these weirs may be disposed approximately midway between intercooler 120 and engine 130.

It will also be understood that, because such weirs project inward from the inner wall of the intake conduit, the cross-sectional path of airflow at the weir is necessarily smaller than the rest of the conduit. Consequently, such weirs not only restrict condensate flow, but also air flow. Accordingly, one of ordinary skill will readily recognize that the diameter of the intake conduit may be formed to be larger so that even the reduced cross-sectional pathway at the weir will be large enough to permit the desired air flow to the engine.

In some embodiments, as shown in FIG. 6, the weir may be disposed immediately downstream of a bend in the intake conduit. Both first condensate retaining structure 605 and second condensate retaining structure 620 are shown disposed immediately downstream from respective bends in intake conduit 125.

Further, with weirs disposed proximate bends in intake conduit 125, the weir may be disposed on a side of intake conduit 125 opposite a direction of the bend. For example, if the intake conduit bends to the left, the weir will be disposed on the right side of the intake conduit.

Figure 7:
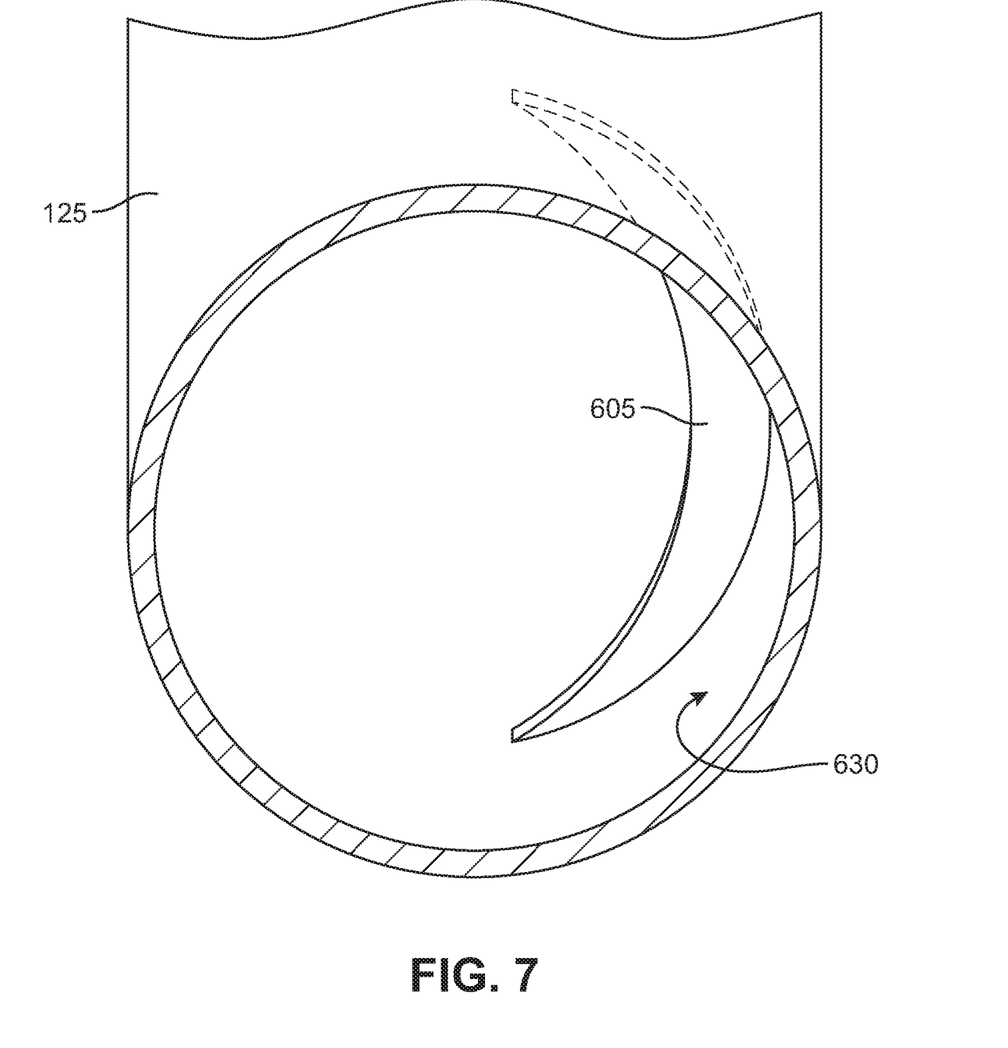
FIG. 7 shows a schematic closer view of the condensate retaining structures shown in FIG. 6.

FIG. 7 shows a schematic closer view of the condensate retaining structures shown in FIG. 6. In some embodiments, at least one of the weirs may have a crescent shape. For example, as shown in FIG. 7, first condensate retaining structure 605 may have a crescent shape and may extend radially inward from a right sidewall 630 of intake conduit 125. The faster air travels through an intake conduit, the higher up the sidewall the condensate will collect, as centripetal forces drive the condensate up the curved sidewall. Thus, the weir may have the crescent shape in order to be taller in the central portion of the conduit sidewall. This may provide the most condensate retention at the highest intake flowrates. It will be noted that, although the weir shown in the accompanying drawings has a crescent shape, other shapes are also possible. For example, some embodiments may include one or more weirs having a semi-circular shape, a rectangular shape, triangular shape, or any other shape that is suitable for restricting the flow of condensate to the engine during various engine operating conditions.

While various embodiments of the invention have been described, the description is intended to be exemplary, rather than limiting and it will be apparent to those of ordinary skill in the art that many more embodiments and implementations are possible that are within the scope of the invention. Any element of any embodiment may be substituted for another element of any other embodiment or added to another embodiment except where specifically excluded. Accordingly, the invention is not to be restricted except in light of the attached claims and their equivalents. Also, various modifications and changes may be made within the scope of the attached claims.

The invention claimed is:

1. An intake system for an internal combustion engine, the intake system comprising:
   an air inlet;
   a forced induction device downstream from the air inlet;
   an intercooler downstream from the forced induction device;
   an intake conduit configured to guide air from the intercooler to an internal combustion engine; and
   a condensate retaining structure associated with the intake conduit and configured to restrict the flow of condensate through the intake conduit, wherein the condensate retaining structure is located downstream from the forced induction device within the intake conduit between the intercooler and the internal combustion engine; and
   wherein the condensate retaining structure is disposed in a straight section of the intake conduit.

2. The system of claim 1, wherein the condensate retaining structure is a section of conduit having an enlarged cross-sectional area as compared to other portions of the intake conduit and forming an internal shoulder configured to retain condensate.

3. The system of claim 2, wherein the intake conduit has a substantially circular cross-sectional shape and the condensate retaining structure has a larger diameter than the other portions of the intake conduit.

4. The system of claim 2, wherein the condensate retaining structure has a radiused shoulder forming a transition between the enlarged cross-sectional area of the condensate retaining structure and the intake conduit.

5. The system of claim 2, wherein a ratio of a diameter of the condensate retaining structure to a diameter of the intake conduit is in a range of 1.1:1 through 1.5:1.

6. The system of claim 1, wherein the condensate retaining structure includes a weir extending inward from a wall of the intake conduit.

7. The system of claim 6, wherein the weir has a crescent shape.

8. The system of claim 6, wherein the weir is disposed immediately downstream of a bend in the intake conduit.

9. The system of claim 1, wherein the condensate retaining structure is disposed approximately midway between the intercooler and the internal combustion engine.

10. The system of claim 1, further including a second condensate retaining structure associated with the intake conduit and configured to restrict the flow of condensate through the intake conduit.

11. An intake system for an internal combustion engine, the intake system comprising:
    an air inlet;
    a forced induction device downstream from the air inlet;
    an intercooler downstream from the forced induction device;
    an intake conduit configured to guide air from the intercooler to an internal combustion engine; and
    a condensate retaining structure associated with the intake conduit and configured to restrict the flow of condensate through the intake conduit, wherein the condensate retaining structure is located downstream from the forced induction device within the intake conduit between the intercooler and the internal combustion engine;

the condensate retaining structure including a section of conduit having a larger diameter than other portions of the intake conduit.

12. The system of claim 11, wherein the condensate retaining structure includes an internal shoulder configured to retain condensate.

13. The system of claim 11, wherein the condensate retaining structure has a radiused shoulder forming a transition between the enlarged cross-sectional area of the condensate retaining structure and the intake conduit.

14. The system of claim 11, wherein the condensate retaining structure forms a bend between sections of the intake conduit.

15. The system of claim 11, wherein the condensate retaining structure is disposed approximately midway between the intercooler and the engine.

16. An intake system for an internal combustion engine, the intake system comprising:
   an air inlet;
   a forced induction device downstream from the air inlet;
   an intercooler downstream from the forced induction device;
   an intake conduit configured to guide air from the intercooler to an internal combustion engine; and
   a condensate retaining structure associated with the intake conduit and configured to restrict the flow of condensate through the intake conduit, wherein the condensate retaining structure is located downstream from the forced induction device within the intake conduit between the intercooler and the internal combustion engine;
   wherein the condensate retaining structure includes a weir extending inward from a wall of the intake conduit.

17. The system of claim 16, wherein the weir has a crescent shape.

18. The system of claim 16, wherein the weir is disposed immediately downstream of a bend in the intake conduit.

19. The system of claim 18, wherein the weir is disposed on a side of the intake conduit opposite a direction of the bend.

20. The system of claim 16, further including a second condensate retaining structure associated with the intake conduit and configured to restrict the flow of condensate through the intake conduit.

* * * * *